PERKINS & McMAHON.
Car Wheel.
No. 3,037.
Patented Apr. 10, 1843.
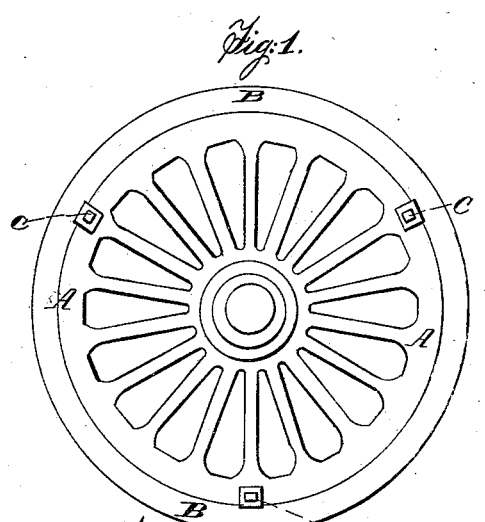
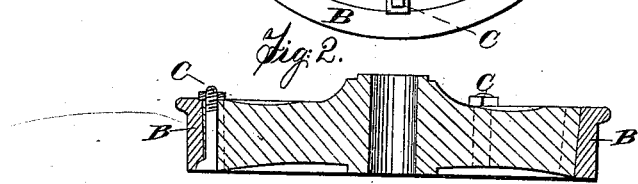

UNITED STATES PATENT OFFICE.

THATCHER PERKINS AND WM. McMAHON, OF BALTIMORE, MARYLAND.

MANNER OF CONSTRUCTING CAST-IRON WHEELS FOR LOCOMOTIVE STEAM-ENGINES, CARS, TRUCKS, &c.

Specification of Letters Patent No. 3,037, dated April 10, 1843.

*To all whom it may concern:*

Be it known that we, THATCHER PERKINS and WILLIAM McMAHON, of the city of Baltimore, in the State of Maryland, have invented a new and useful Improvement in the Manner of Constructing Cast-Iron Wheels for Locomotive Steam-Engines, Cars, Trucks, and other Vehicles; and we do hereby declare that the following is a full and exact description thereof.

We cast our wheels in two parts; one of which is to constitute the main body of the wheel, and is to consist of the hub, or nave, the spokes, and a rim surrounding said spokes, such rim not being of the ordinary thickness, and not being furnished with a flanch, as it is not to constitute the head of the wheel. The second part consists of a rim only, which is to resemble the wrought-iron tire sometimes used for such vehicles, it being furnished with a flanch, and otherwise so formed as to constitute the tread of the wheel. This part is to be cast in a chill, as it is to form a cast-iron tire. The rim surrounding the spokes, is to be turned, or otherwise made true, and is to have a slight draw, or bevel, that the cast-iron tire, when duly prepared, may pass readily on to it, and fit closely when the two parts are in place. The chilled, cast-iron tire is also to be turned, ground, or rendered true in any other manner, on its inner surface, and is to have a bevel, or draw, corresponding with that of the rim, on to which it is to pass, so that when put together their contact shall be as perfect as possible in every part. The two parts are to be secured together by means of screw bolts passing through the joint from side to side of the wheel.

In the accompanying drawing, Figure 1, shows the inner face of one of the wheels, and Fig. 2, a cross section thereof.

A, A, is the rim which is cast in one piece with the spokes.

B, B, is the cast-iron, chilled rim, and C, C, C, screw bolts by which the two parts are held together.

There are two great advantages presented by wheels made upon the plan herein described. In the first place, it will very rarely happen that the interior, or body, of the wheel will be broken, and should the chilled tire break, it can be readily replaced without disturbing the fittings of the wheel to the axle, and that at a comparatively small expense; this breakage will be much less liable to occur than with the ordinary cast-iron, chilled wheels, as the chilled tire when cast alone will not be in that state of tension which unavoidably results from its being cast with the spokes. The second great advantage, is in the additional security to the vehicle should the cast-iron tire break, as the interior rim will still constitute a wheel upon which it may run until the train is stopped.

We are aware that the outer rim of cast-iron wheels has been made separate from the spokes, and body of the wheel, and we do not therefore claim the so doing as of our invention; but What we do claim as new, and desire to secure by Letters Patent, is the manner in which we effect this, that is to say, we claim—

1. The fitting of a chilled cast-iron rim onto an inner rim, cast with the spokes, by making the inner surface of the former, and the outer surface of the latter slightly conical, and binding them together by screw bolts, substantially in the manner herein set forth.

2. And we will here remark that we have it in contemplation sometimes to cast the tire, or outer rim, without a chill, to anneal this so as to convert it into malleable iron, and subsequently to case-harden it on its outer surface, or that part which constitutes the tread and flanch; which mode of procedure will, manifestly, be nothing more than a modification of the manner of manufacturing wheels, as herein set forth; and will, as we believe, furnish a cast-iron tire, which, in its toughness and in the hardness of its surface, will present advantages not afforded by any other.

THATCHER PERKINS.
WILLIAM McMAHON.

Witnesses:
ROBERT M. WELCH,
GEO. P. WOODWARD.